United States Patent
Saegusa et al.

(10) Patent No.: US 8,845,106 B2
(45) Date of Patent: Sep. 30, 2014

(54) PROJECTOR HAVING CONNECTION MEMBER FIXED TO COLOR COMBINING OPTICAL DEVICE

(75) Inventors: Takashi Saegusa, Matsumoto (JP); Osamu Ishibashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 324 days.

(21) Appl. No.: 13/287,699

(22) Filed: Nov. 2, 2011

(65) Prior Publication Data

US 2012/0133895 A1 May 31, 2012

(30) Foreign Application Priority Data

Nov. 30, 2010 (JP) ................. 2010-266826

(51) Int. Cl.
- *G03B 21/14* (2006.01)
- *G03B 21/28* (2006.01)
- *H04N 9/31* (2006.01)

(52) U.S. Cl.
CPC .............. *G03B 21/14* (2013.01); *H04N 9/3105* (2013.01); *H04N 9/317* (2013.01); *G03B 21/28* (2013.01)
USPC ............... 353/20; 353/119; 353/81; 353/100; 353/31

(58) Field of Classification Search
USPC ................. 353/20, 119, 81, 100, 31
See application file for complete search history.

(56) References Cited

U.S. PATENT DOCUMENTS

| | | | |
|---|---|---|---|
| 2009/0323025 A1 | 12/2009 | Nagumo | |
| 2011/0261325 A1* | 10/2011 | Sato | 353/20 |
| 2011/0292353 A1* | 12/2011 | Iwane et al. | 353/85 |

FOREIGN PATENT DOCUMENTS

JP  2010-008638 A  1/2010

* cited by examiner

*Primary Examiner* — Georgia Y Epps
*Assistant Examiner* — Magda Cruz
(74) *Attorney, Agent, or Firm* — ALG Intellectual Property, LLC (57) ABSTRACT

In addition to reflective light modulation devices, reflective polarization plates, a color combining optical device, and support bodies, a projector is provided with connection members fixed to the color combining optical device and for supporting the support bodies. Support positions of the support body by the connection members are disposed on the opposite side to the disposition position of the reflective light modulation device with respect to a plane including a polarization split surface of the reflective polarization plate.

6 Claims, 10 Drawing Sheets

PROJECTOR HAVING CONNECTION MEMBER FIXED TO COLOR COMBINING OPTICAL DEVICE

BACKGROUND

1. Technical Field

The present invention relates to a projector.

2. Related Art

In the past, there has been known a projector provided with three reflective light modulation devices such as liquid crystal on silicon (LCOS) for respectively modulating three colored lights of R (red), G (green), and B (blue), a color combining optical device for combining the colored lights respectively modulated by the reflective light modulation devices, and a projection lens for projecting the light beam thus combined (see, e.g., JP-A-2010-008638 (Document 1)).

The projector described in Document 1 is provided with three reflective polarization plates for performing polarization separation on the light beam incident thereto into linearly polarized lights having respective polarization directions perpendicular to each other, three attachment members (support bodies) for supporting the reflective light modulation devices and the reflective polarization plates, and three adjustment members fixed to the color combining optical device and for supporting the support body in addition to the reflective light modulation devices and the color combining optical device.

The adjustment member is provided with a main body attached to a light entrance surface of the color combining optical device, and a pair of arm sections projecting from positions opposed to each other toward the light emission surface in the outer edge of the main body.

The pair of arm sections are each provided with an engaging projection section projecting toward the other of the arm sections.

The support body is formed of a hollow member having a triangular prism shape, and the reflective light modulation device and the reflective polarization plate are attached to the respective side surfaces thereof.

Further, the portions corresponding to the respective bottom surfaces of the triangular prism shape of the support body are respectively provided with engagement receiving sections in which the pair of engaging projection sections are respectively inserted in a loose-fitting manner.

Further, the support body is fixed to the color combining optical device by fixing the engagement receiving section and the engaging projection section to each other with an adhesive in the condition of loose-fitting the pair of engaging projection sections to the pair of engagement receiving sections.

Incidentally, in the case in which the support body is fixed to the color combining optical device (the adjustment member) by curing the adhesive, the support body might be displaced from a desired position due to the contraction of the adhesive when curing. Further, also in the case in which an external force is applied to the projector when the projector is in use, the support body might be displaced from the desired position similarly to the above.

Further, if the support body is displaced from the desired position, it results that the reflective light modulation device is displaced from the position (the design position) where the reflective light modulation device is located at the back focus position of the projection lens, and at the same time, no pixel shift between the reflective light modulation devices exists, and therefore, the pixel shift between the reflective light modulation devices becomes easy to occur.

In particular, in the projector described in Document 1, the support position (fixation position) of the support body with respect to the color combining optical device (the adjustment member) is located in the portion corresponding to each of the bottom surfaces of the support body.

Specifically, the support position is located at the position distant from the center position (hereinafter referred to as a virtual image center) of a light modulation plane (a pseudo light modulation plane) obtained by displacing symmetrically the light modulation plane (the plane on which the image is formed by light modulation) of the reflective light modulation device disposed at the design position in a virtual manner taking the plane including the polarization separation plane of the reflective polarization plate as a reference.

If, for example, there is adopted a support structure in which rotation around the virtual image center occurs when the support body is displaced from the desired position, the position of the principal ray (the pseudo principal ray) emitted in a pseudo manner from the virtual image center and entering perpendicularly the light entrance surface of the color combining optical device does not change. In other words, in the case of such a support configuration, no pixel shift occurs even if the support body is displaced from the desired position.

However, in the projector described in Document 1, since the support position is located at the position distant from the virtual image center as described above, it results that rotation around the position distant from the virtual image center easily occurs when the support body is displaced from the desired position.

In other words, it results that the amount of displacement of the pseudo principal ray due to the displacement of the support body is large, and as a result, the amount of pixel shift becomes large. Therefore, there arises a problem that it is difficult to form a preferable projection image.

SUMMARY

An advantage of some aspects of the invention is to provide a projector capable of reducing the pixel shift, and thus forming a preferable projection image.

An aspect of the invention is directed to a projector including a plurality of reflective light modulation devices which respectively modulates a plurality of colored lights, a plurality of reflective polarization plates respectively disposed in a tilted manner with respect to the plurality of reflective light modulation devices, and respectively perform polarization split on the plurality of incident colored lights, a color combining optical device which combines the colored lights, which are respectively modulated by the plurality of reflective light modulation devices, and on which the polarization split is respectively performed by the plurality of reflective polarization plates, a plurality of support bodies which respectively supports the reflective light modulation devices and the reflective polarization plates, and a connection member which fixes the color combining optical device and supports the support bodies, wherein support positions of the support body by the connection member are disposed on an opposite side to a disposition position of the reflective light modulation device with respect to a plane including a polarization split surface of the reflective polarization plate.

Here, in this aspect of the invention, as the support structure of the support body by the connection member, the structure of directly supporting the support body by the connection member can be adopted, or the structure of supporting the support body by the connection member via another member can also be adopted.

Since in this aspect of the invention the support positions of the support body by the connection member are disposed at the positions described above, the support positions can be located at the positions closer to the virtual image center compared to the configuration of the related art.

Therefore, if the support body is displaced from the desired position, it becomes possible to rotate the support body around the position adjacent to the virtual image center or around the virtual image center.

Therefore, even in the case in which the support body is displaced from the desired position when curing the adhesive for fixing the connection member and the support body with each other, or when an external force is applied to the projector while using the projector, the displacement amount of the pseudo principal ray due to the displacement of the support body can be reduced, and as a result, the amount of the pixel shift can be reduced. Therefore, the preferable projection image can be formed.

In the projector of the aspect of the invention, it is preferable that the support positions are respectively disposed at positions symmetric about a plane including light axes of an incident light beam and an outgoing light beam of the reflective polarization plate.

Since in this configuration of the invention the support positions are respectively disposed at the positions described above, the support body can be rotated around the position adjacent to the virtual image center or around the virtual image center when the support body is displaced from the desired position while keeping the support state of the support body by the connection section stable.

In the projector of the aspect of the invention, it is preferable that, a center of the support positions is located at a position extending from the virtual image center in a direction perpendicular to a plane including light axes of an incident light beam and an outgoing light beam of the reflective polarization plate assuming that a light modulation surface obtained by virtually displacing symmetrically a light modulation surface of the reflective light modulation device about the plane is a pseudo light modulation surface, and a center position of the pseudo light modulation surface is a virtual image center if the light modulation surface of the reflective light modulation device is located at a back focus position of a projection lens, and is disposed at a position with no pixel shift between the reflective light modulation devices.

Since in this configuration of the invention the support positions are respectively disposed at the positions described above, the support body can be rotated around the virtual image center when the support body is displaced from the desired position.

Therefore, it is possible to approximately zero the amount of displacement of the pseudo principal ray due to the displacement of the support body, and therefore, it is possible to approximately zero the amount of pixel shift.

In the projector of the aspect of the invention, it is preferable that, the support positions are respectively disposed at positions 180° rotationally symmetric about a normal line of the pseudo light modulation surface passing through the virtual image center assuming that a light modulation surface obtained by virtually displacing symmetrically a light modulation surface of the reflective light modulation device about the plane is a pseudo light modulation surface, and a center position of the pseudo light modulation surface is a virtual image center if the light modulation surface of the reflective light modulation device is located at a back focus position of a projection lens, and is disposed at a position with no pixel shift between the reflective light modulation devices.

Since in this configuration of the invention the support positions are respectively disposed at the positions described above, the support body can be rotated around the position adjacent to the virtual image center or around the virtual image center when the support body is displaced from the desired position while keeping the support state of the support body by the connection section stable.

In the projector of the aspect of the invention, it is preferable that support structures of the support body by the connection member are disposed so as to be 180° rotationally symmetric about a normal line of the pseudo light modulation surface passing through the virtual image center.

Since in this configuration of the invention the support structures of the support body by the connection member are disposed as described above, the support structures respectively disposed at the positions 180° rotationally symmetric can be made similar to each other, and thus the support structures can be manufactured easily.

In the projector of the aspect of the invention, it is preferable that the connection members are provided as a pair, respectively fixed to both of a pair of intersection end surfaces intersecting with a plurality of light entrance surfaces to which the plurality of colored lights are respectively incident in the color combining optical device, and are disposed so as to sandwich the support body.

According to this configuration of the invention, since the connection members do not intervene between the color combining optical device and the support body, the connection members can easily be attached, and the unit formed by fixing the support body to the color combining optical device can be manufactured easily.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Figure 1:
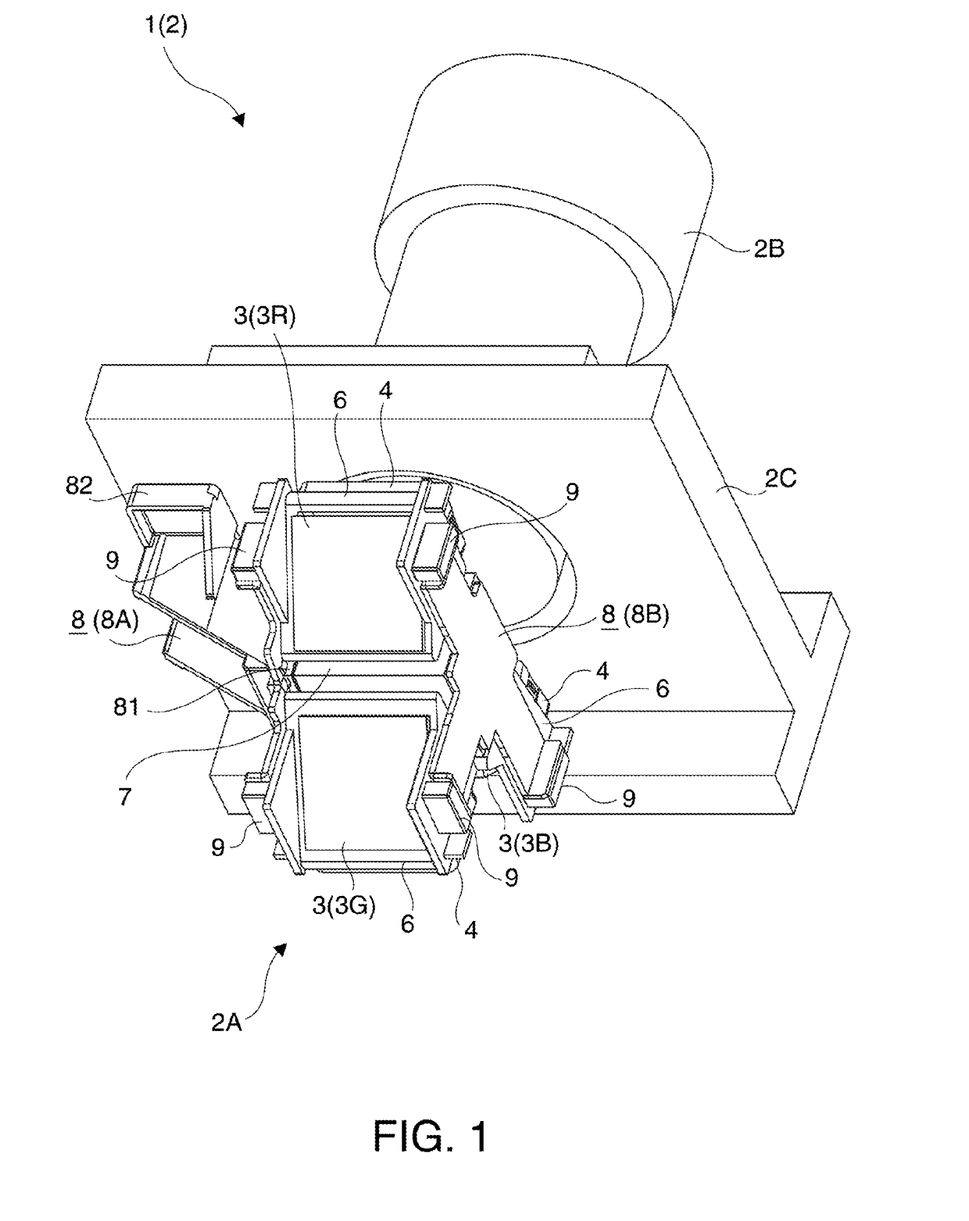
FIG. 1 is a diagram showing a schematic configuration of a projector according to an embodiment of the invention.

An embodiment of the invention will hereinafter be explained with reference to the accompanying drawings.
Configuration of Projector FIG. 1 is a diagram showing a schematic configuration of a projector 1. Specifically, FIG. 1 is a perspective view showing a configuration of a projection unit 2 as a substantial part of the present embodiment.

The projector 1 projects an image to thereby display a projection image on a screen (not shown).

It should be noted that in the projector 1 according to the present embodiment, although not shown in the drawings, there is adopted a telecentric optical system.

Further, the projector 1 is provided with a projection unit 2 housed inside an exterior housing (not shown) as shown in FIG. 1.

The projection unit 2 is for respectively modulating the colored lights of R, G, and B emitted from a light source device (not shown) and then separated by a color separation optical system such as a dichroic mirror, and combining and then projecting the colored lights thus modulated.

As shown in FIG. 1, the projection unit 2 is provided with an optical device 2A, a projection lens 2B, and a base body 2C for supporting the optical device 2A and the projection lens 2B.

Configuration of Optical Device

Figure 2:
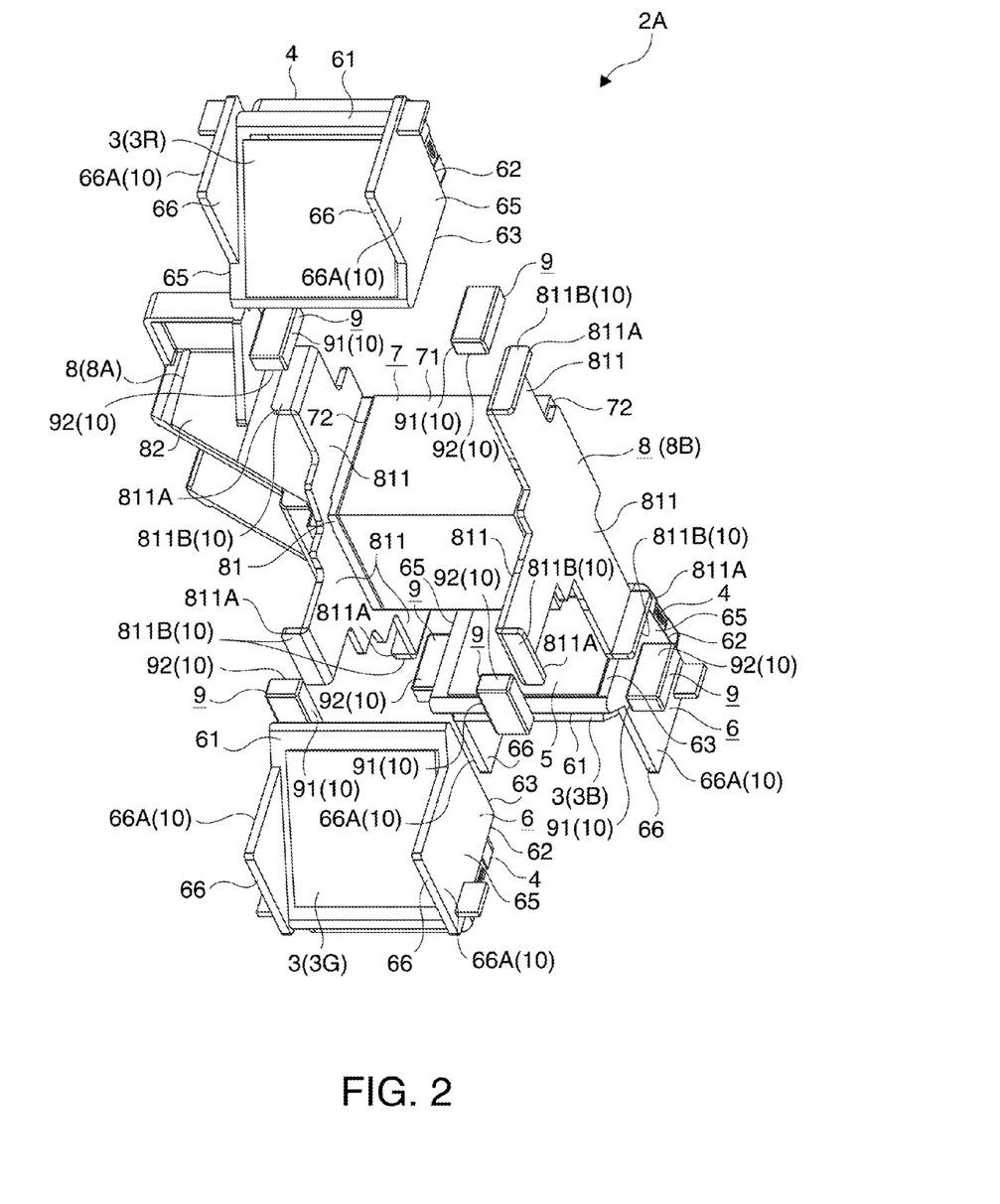
FIG. 2 is a diagram showing a configuration of an optical device in the present embodiment.
Figure 3A:
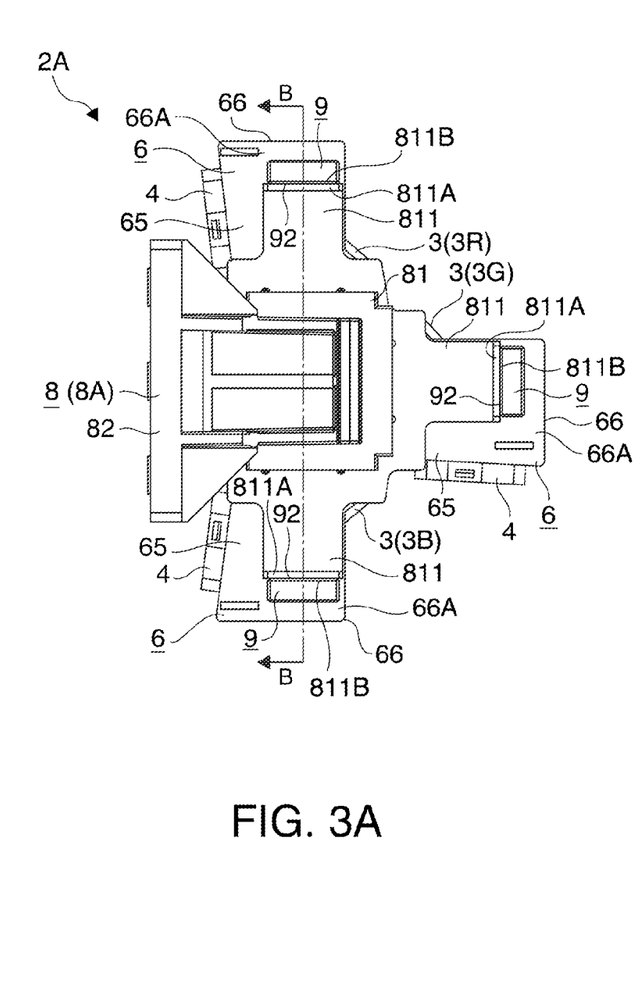
FIGS. 3A and 3B are diagrams showing the configuration of the optical device in the present embodiment.
Figure 3B:
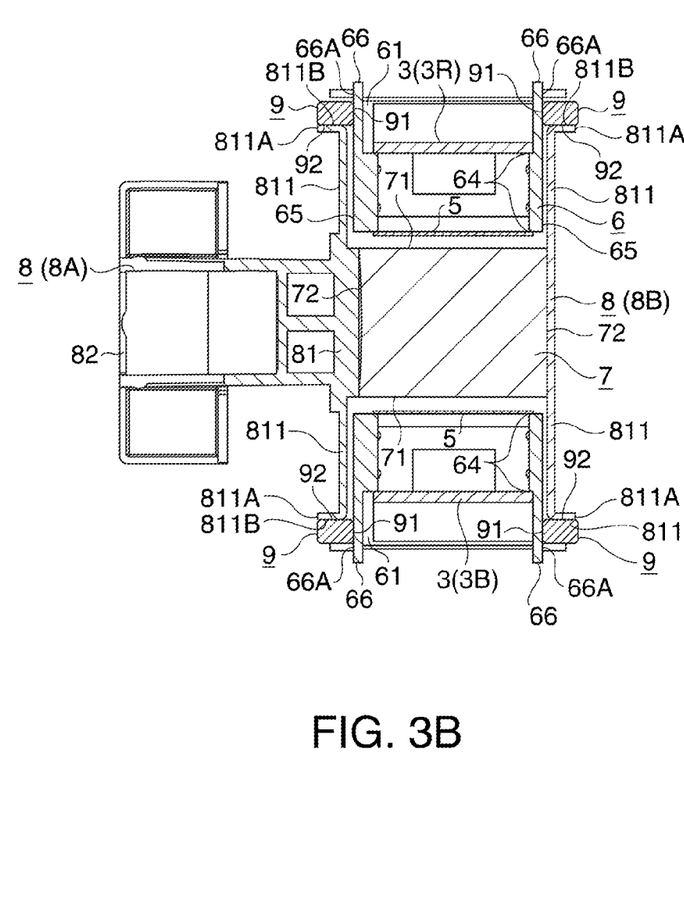
Figure 4:
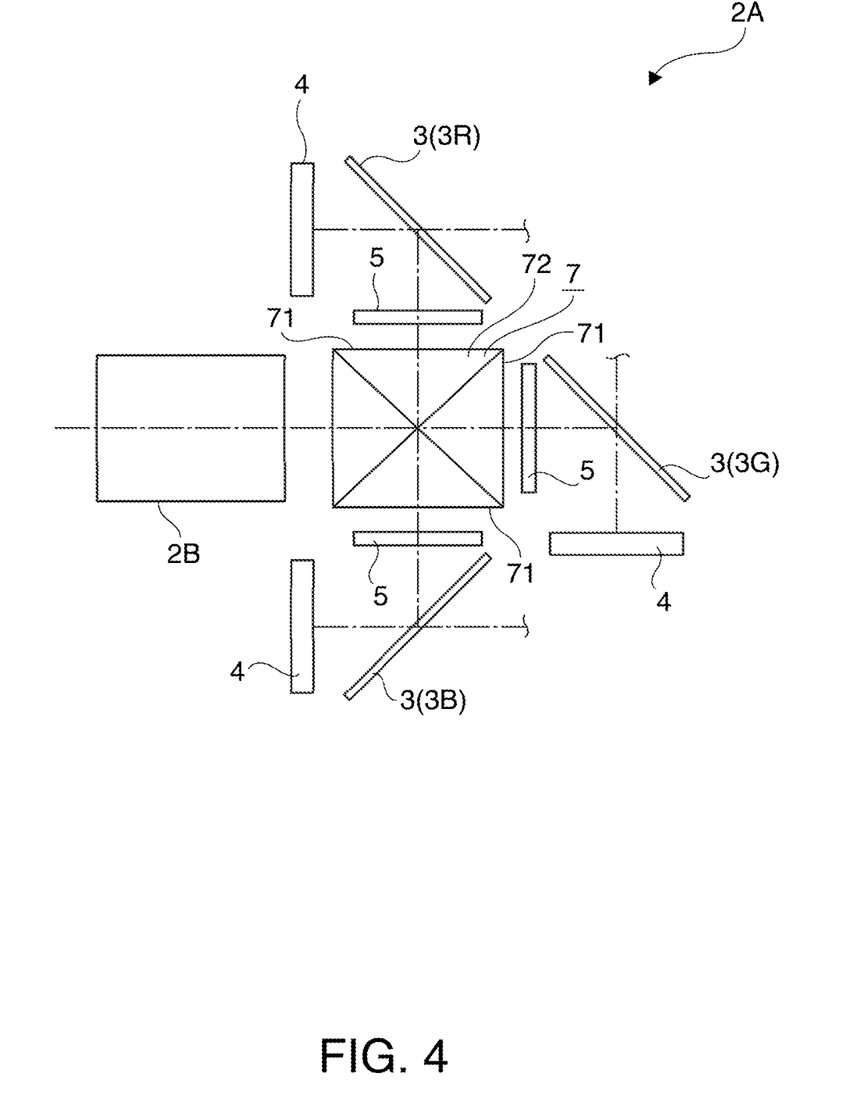
FIG. 4 is the configuration of the optical device in the present embodiment.

FIGS. 2 through 4 are diagrams showing a configuration of the optical device 2A. Specifically, FIG. 2 is an exploded perspective view showing the configuration of the optical device 2A. FIG. 3A is a plan view of the optical device 2A viewed from the left in FIG. 1. FIG. 3B is a cross-sectional view along the line B-B shown in FIG. 3A. FIG. 4 is a schematic diagram of the optical system of the optical device 2A viewed from the left in FIG. 1.

As shown in FIGS. 1 through 4, the optical device 2A is provided with three wire grids 3 as reflective polarization plates, three reflective light modulation devices 4, three polarization plates 5 (FIGS. 2 through 4), three support bodies 6 (FIGS. 1, 2, 3A, and 3B), a cross dichroic prism 7 as the color combining optical device, connection members 8 (FIGS. 1, 2, 3A, and 3B), and fixation members 9 (FIGS. 1, 2, 3A, and 3B).

It should be noted that hereinafter the wire grid for the R colored light is denoted as 3R, the wire grid for the G colored light is denoted as 3G, and the wire grid for the B colored light is denoted as 3B for the sake of convenience of explanation.

Configuration of Wire Grid

The three wire grids 3 perform polarization split on the light beam incident thereto due to diffraction based on the grating structure. As shown in FIGS. 1 through 4, each of the wire grids 3 is disposed in the state of being tilted roughly 45° with respect to the light axis of the incident light beam using the support body 6.

Further, each of the wire grids 3 transmits a predetermined polarized light (a first linearly polarized light) out of the incident light beam, and reflects a polarized light (a second linearly polarized light) having the polarization direction perpendicular to the polarization direction of the first linearly polarized light to thereby perform polarization split on the incident light beam.

Configuration of Reflective Light Modulation Device

The three reflective light modulation devices 4 are each provided with a reflective liquid crystal panel formed of a so-called LCOS having a liquid crystal formed on a silicon substrate. As shown in FIGS. 1 through 4, each of the reflective light modulation devices 4 is disposed in the state of being roughly perpendicular to the light axis of the light beam transmitted through the respective wire grids 3 using the support body 6.

Further, each of the reflective light modulation devices 4 is controlled in the orientation state of the liquid crystal in accordance with a signal input from a control device (not shown), and modulates the polarization direction of the polarized light transmitted through the wire grid 3, and then reflects the polarized light toward the wire grid 3. Out of the light beam modulated by the reflective light modulation device 4 and reflected toward the wire grid 3, only the polarized light having the same polarization direction as that of the second linearly polarized light is reflected by the wire grid 3 and then proceeds toward the prism 7.

Configuration of Polarization Plate

The three polarization plates 5 each transmit the polarized light, which is modulated by the respective reflective light modulation devices 4, then reflected by the wire grid 3, and has roughly the same polarization direction as the polarization direction of the second linearly polarized light. In other words, there is adopted the configuration, which uses both of the wire grids 3 and the polarization plates 5 to thereby eliminate the polarization component described above by the polarization plates 5 even in the case in which the polarization component other than the desired linearly polarized light is reflected by the wire grid 3.

Further, as shown in FIGS. 2 through 4, the polarization plates 5 are disposed so as to be opposed to the respective light entrance surfaces 71 of the prism 7 using the support bodies 6.

Configuration of Cross Dichroic Prism

As shown in FIG. 2 or FIGS. 3A and 3B, the prism 7 has the three light entrance surfaces 71 to which the respective colored lights transmitted through the respective polarization plates 5 are incident, and combines the incident colored lights thereto.

The prism 7 has a substantially square planar shape composed of four rectangular prisms bonded with each other, and on the interfaces on which the rectangular prisms are bonded with each other, there are formed two dielectric multilayer films. These dielectric multilayer films transmit the G colored light reflected by the wire grid 3G, and respectively reflect the R and B colored lights reflected by the respective wire grids 3R, 3B. The colored lights are combined in such a manner as described above. Subsequently, the light beam (the image) combined by the prism 7 is then projected toward the screen via the projection lens 2B.

Configuration of Support Body

The three support bodies 6 support the wire grids 3, the reflective light modulation devices 4, and the reflective polarization plates 5 disposed for the colored lights of R, G, and B, respectively.

As shown in FIG. 2 or FIGS. 3A and 3B, the support body 6 is the hollow member shaped like a triangular prism having a roughly rectangular equilateral triangle cross-sectional shape, and is provided with a first side surface 61 as a tilted surface, and second and third side surfaces 62, 63 having the apex angle therebetween. Further, each of the side surfaces 61 through 63 is provided with an opening section 64 (FIG. 3B).

The wire grid 3 is fixed to the first side surface 61.

Further, the reflective light modulation device 4 is fixed to the second side surface 62.

Further, the polarization plate 5 is fixed to the third side surface 63.

The opening sections 64 are blocked by respectively fixing the members 3 through 5 to the side surfaces 61 through 63 as described above, and thus the internal space of the support body 6 is sealed. In other words, since it results that the reflecting surface of the reflective light modulation device 4 is disposed inside the sealed space, powder dust can be prevented from adhering to the reflecting surface, and thus, degradation of the projection image such that the powder dust attached to the reflecting surface is reflected in the projection image as a shadow can be prevented.

Further, in the support body 6, a pair of bottom surfaces 65 intersecting with the side surfaces 61 through 63 are each formed to have a flat shape as shown in FIG. 2 or FIGS. 3A and 3B.

Further, as shown in FIG. 2 or FIGS. 3A and 3B, in the support body 6, projection sections 66 projecting in a direction perpendicular to the first side surface 61 are provided to the first side surface 61 on the sides of the respective bottom surfaces 65.

In each of the projection sections 66, the surface 66A (hereinafter described as a fixation surface 66A) on the bottom surface 65 side is formed so as to be coplanar with the bottom surface 65.

Configuration of Connection Members

As shown in FIG. 2 or FIGS. 3A and 3B, the connection members 8 are provided as a pair, fixed respectively to a pair of intersection end surfaces 72 of the prism 7, the intersection end surfaces intersecting with the light entrance surfaces 71 thereof, and is disposed so as to sandwich the support bodies 6 therebetween.

It should be noted that hereinafter the connection member located on the left in FIG. 2 is referred to as a first connection member 8A, and the connection member located on the right is referred to as a second connection member 8B for the sake of convenience of explanation.

Further, the second connection member 8B has substantially the same configuration as that of a base section 81 described later of the first connection member 8A, and is therefore provided with the same reference symbols, and the detailed explanation therefor will be omitted.

As shown in FIGS. 1, 2, 3A, and 3B, the first connection member 8A is formed integrally of the base section 81 and a connection section 82.

The base section 81 is formed of a rectangular plate having a planar shape roughly the same as the planar shape of the intersection end surface 72.

In the base section 81, each end portion arranged to be parallel to the corresponding light entrance surface 71 is provided with a projection section 811 projecting toward the upstream side of the light path as shown in FIG. 2 or FIGS. 3A and 3B.

Further, the projection section 811 has a tip portion 811A bent roughly 90° toward the side getting away from the second connection member 8B. It should be noted that the tip portion 811A in the second connection member 8B is bent roughly 90° toward the side getting away from the first connection member 8A.

Further, in the tip portion 811A, a surface 811B (hereinafter described as a flat surface 811B) located on the upstream side of the light path is formed to be a flat surface parallel to the corresponding light entrance surface 71.

Here, in FIG. 2, a pair of flat surfaces 811B (the flat surfaces 811B of the respective connection members 8A, 8B) located laterally are arranged to be located on roughly the same plane.

As shown in FIG. 1, the connection section 82 is a part projecting from the plate surface of the base section 81 toward an out-of-plane direction and for fixing the optical device 2A to the base body 2C.

It should be noted that in the present embodiment the connection members 8 are made of aluminum (linear expansion coefficient (1/° C.) of $2 \times 10^{-5}$) similarly to the support bodies 6.

Configuration of Fixation Members

The fixation members 9 are members for fixing the support bodies 6 to the prism 7 in cooperation with the connection members 8. As shown in FIG. 2 or FIGS. 3A and 3B, the fixation members 9 are disposed so that each of the support bodies 6 is held between a pair of fixation members 9, and thus, totally six fixation members 9 are provided to the three support bodies 6.

Each of the fixation members 9 is made of a light transmissive material for transmitting ultraviolet light, and has a roughly rectangular solid shape.

Further, in the fixation member 9, two of the six surfaces intersecting with each other (intersecting at an angle of about 90°) out of the six surfaces, namely a first bonding surface 91 and a second bonding surface 92, are respectively bonded to the fixation surface 66A and the flat surface 811B as shown in FIG. 2 or FIGS. 3A and 3B.

It should be noted that in the present embodiment the area of the first bonding surface 91 is set to be smaller than the area of the second bonding surface 92.

Further, in the present embodiment, the fixation members 9 are each made of glass (linear expansion coefficient (1/° C.) of $8 \times 10^{-6}$).

Manufacturing Method of Projection Unit

Then, the manufacturing method of the projection unit 2 described above will be explained.

Firstly, the operator fixes the connection members 8 to the prism 7, and at the same time, fixes the first connection member 8A to the base body 2C to thereby integrate the projection lens 2B and the prism 7 with each other. Further, the operator fixes the members 3 through 5 to the support bodies 6.

Subsequently, the operator uses a jig (not shown) to set the support body 6 to the posture in which the polarization plate 5 is opposed to the light entrance surface 71 while holding the support body 6 with the jig.

Then, after setting the three support bodies 6 to the posture described above, the operator starts positioning (the focus adjustment and the alignment adjustment) of each of the reflective light modulation devices 4.

It should be noted that hereinafter, the normal direction of the light entrance surface 71 is defined as a Z axis, the directions along a pair of peripheries of the light entrance surface 71 intersecting with each other are respectively defined as an X axis and a Y axis (see FIG. 5) for the sake of convenience of explanation.

Firstly, as described hereinafter, the operator performs the focus adjustment.

Specifically, the operator operates the jig to emit the light beam for the focus adjustment from the jig toward the wire grid 3.

Subsequently, while checking the projection image, which is modulated by the reflective light modulation device 4 and projected on the screen via the wire grid 3, the polarization plate 5, the prism 7, and the projection lens 2B, the operator operates the jig to move the support body 6 so that the projection image becomes in the focused state (so that the reflective light modulation device 4 is located at the back focus position of the projection lens 2B).

Specifically, the operator operates the jig to move the support body 6 in a direction along the Z axis, a rotational direction (hereinafter referred to as an Xθ direction) around the X axis, and a rotational direction (hereinafter referred to as a Yθ direction) around the Y axis.

Then, after performing the focus adjustment of the three reflective light modulation devices 4, the operator performs the alignment adjustment as described below.

Specifically, the operator operates the jig to emit the light beams (the colored lights of R, G, and B) for the alignment adjustment from the jig toward the wire grid 3.

Subsequently, while checking the projection images of R, G, and B, which are modulated by the respective reflective light modulation devices 4 and projected on the screen via the respective wire grids 3, the respective polarization plates 5, the prism 7, and the projection lens 2B, the operator operates the jig to move the respective support bodies 6 so that the pixels of the respective projection images coincide with each other.

Specifically, the operator operates the jig to move the respective support bodies 6 in a direction along the X axis, a direction along the Y axis, and a rotational direction (hereinafter referred to as a Zθ direction) around the Z axis.

Figure 5:
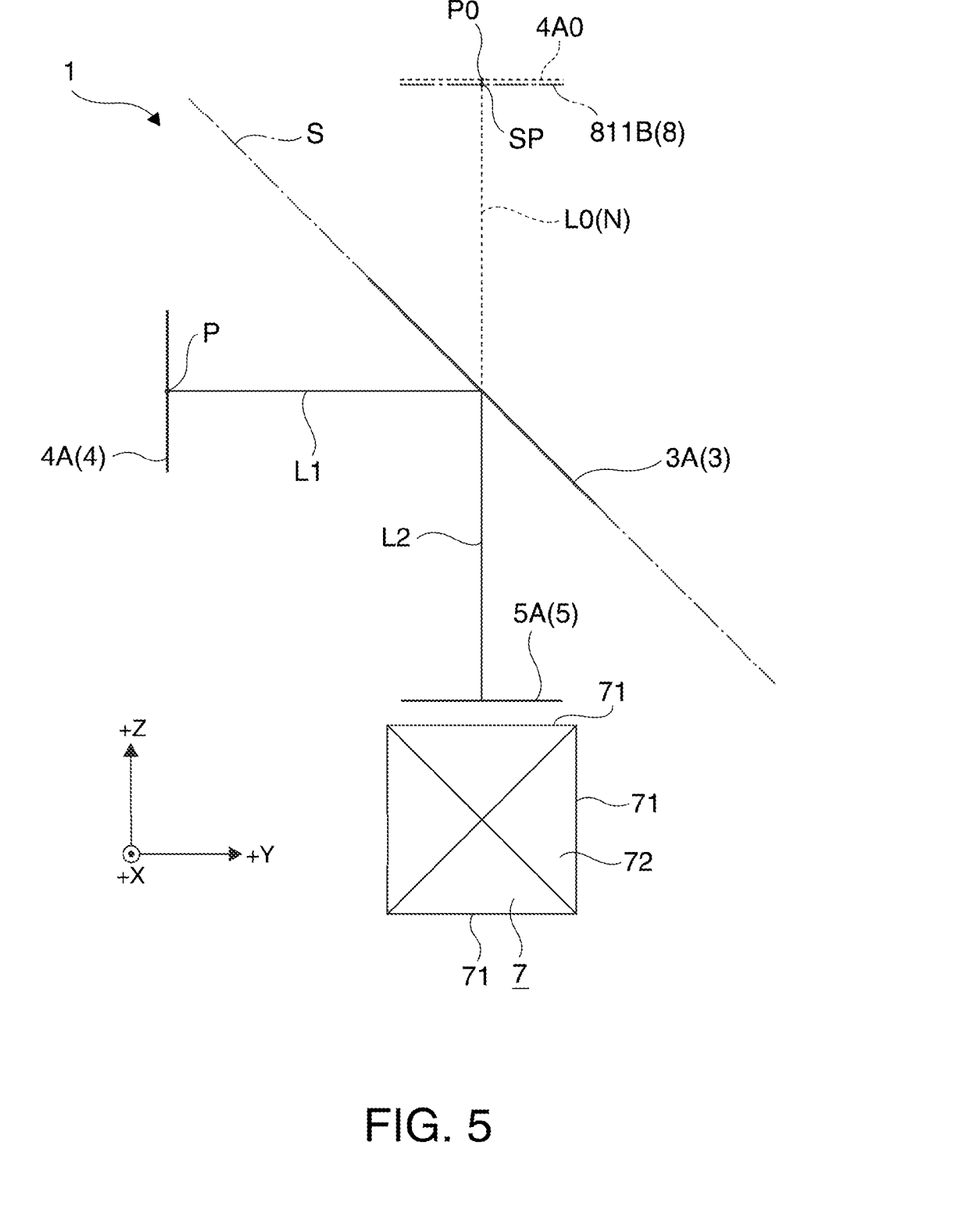
FIG. 5 is a diagram for explaining a positional relationship of a wire grid, a reflective light modulation device, and a polarization plate with respect to a prism after a position adjustment in the present embodiment.
Figure 6:
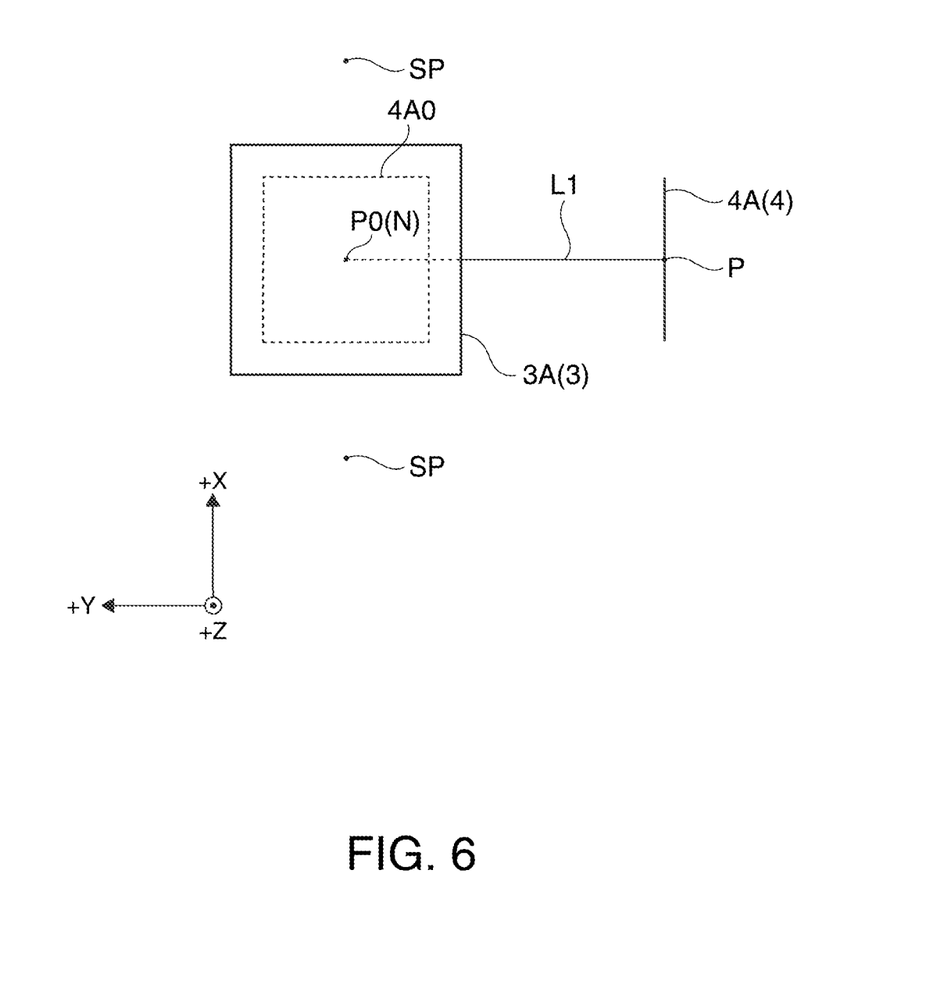
FIG. 6 is a diagram for explaining the positional relationship of the wire grid, the reflective light modulation device, and the polarization plate with respect to the prism after the position adjustment in the present embodiment.

FIGS. 5 and 6 are diagrams for explaining the positional relationship of the wire grid 3, the reflective light modulation device 4, and the polarization plate 5 with respect to the prism 7 after the position adjustment. Specifically, FIG. 5 shows the positional relationship between the members 3 through 5 and 7 located only on the R colored light side when viewing the optical device 2A from the left in FIG. 1. The same can be applied to the positional relationships on the G colored light side and the B colored light side. FIG. 6 is a diagram of the positional relationship shown in FIG. 5 viewed from the +Z axis side.

It should be noted that FIGS. 5 and 6 show the wire grid 3 partially, namely only a polarization split surface 3A for reflecting the second linearly polarized light and transmitting the first linearly polarized light out of the light beam modulated by the reflective light modulation device 4. Further, a light modulation surface 4A for modulating the incident light beam to thereby form the image is only shown with respect to the reflective light modulation device 4. Further, a light entrance surface 5A is only shown with respect to the polarization plate 5.

Further, in FIGS. 5 and 6, rays L1, L2 represent the principal ray emitted from the center position P (the center position of the image) of the light modulation surface 4A and incident perpendicularly to the light entrance surface 71 via the polarization split surface 3A.

Further, in FIGS. 5 and 6, a pseudo light modulation surface 4A0 indicated by a broken line represents a light modulation surface obtained by symmetrically displacing the light modulation surface 4A in a virtual manner, which is located at the back focus position of the projection lens 2B due to the position adjustment described above, and located at the design position with no pixel shift between the reflective light modulation devices 4, about the plane S including the polarization split surface 3A.

Further, in FIG. 5, the ray L0 indicated by the broken line represents the pseudo principal ray emitted from the center position P0 (the position obtained by symmetrically displacing the center position P about the plane S) of the pseudo light modulation surface 4A0 and incident perpendicularly to the light entrance surface 71.

Further, in FIG. 5 the flat surface 811B is indicated by a dashed-dotted line.

If the position adjustment is performed as described above, the members 3 through 5 are located so that the principal ray L2 and the pseudo principal ray L0 proceed toward the center position of the light entrance surface 71.

Further, the support positions SP (the center positions of the respective flat surfaces 811B) of the support bodies 6 via the fixation members 9 in the respective connection members 8A, 8B are located on the opposite side to the disposition position of the reflective light modulation device 4 about the plane S as shown in FIG. 5.

More specifically, as shown in FIG. 5, each of the support positions SP roughly coincides with the virtual image center P0 viewed from a direction along the X axis, and is located on the normal line N (the pseudo principal ray L0 in the present embodiment) of the pseudo light modulation surface 4A0 passing through the virtual image center P0.

Further, as shown in FIG. 6, the support positions SP are respectively located at the positions 180° rotationally symmetric about the normal line N.

In other words, as shown in FIG. 5 or FIG. 6, the support positions SP are respectively located at positions symmetric about a plane (a plane including the rays L1, L2) including the light axes of the incident light beam and the outgoing light beam to and from the wire grid 3. Further, the support positions SP are located at positions extending from the virtual image center P0 in the direction (the X-axis direction) perpendicular to the plane including the rays L1, L2.

It should be noted that the flat surfaces 811B, the fixation surfaces 66A, and the first and second bonding surfaces 91, 92 respectively disposed in the direction along the X axis are also set so as to be 180° rotationally symmetric about the normal line N passing through the virtual image center P0 similarly to the above.

In other words, the flat surfaces 811B, the fixation surfaces 66A, and the first and second bonding surfaces 91, 92 respectively disposed in the direction along the X axis correspond to a support structure 10 (see FIG. 2) in the present embodiment of the invention.

Further, since the support positions SP and the support structures 10 respectively located in the direction along the X axis are set as described above in the present embodiment, if the support body 6 is displaced from the desired position (the position of the support body 6 after the position adjustment), it results that the rotation centered on the virtual image center P0 occurs.

Then, after executing the position adjustment described above, the operator applies an ultraviolet cure adhesive to the first and second bonding surfaces 91, 92 of each of the fixation members 9.

Further, the operator attaches each of the fixation members 9 so that the first bonding surface 91 adheres to the fixation surface 66A, and the second bonding surface 92 adheres to the flat surface 811B.

Subsequently, the operator applies the ultraviolet light toward the fixation member 9 to thereby cure the adhesive between the first bonding surface 91 and the fixation surface 66A and the adhesive between the second bonding surface 92 and the flat surface 811B.

By curing the adhesives as described above, the support bodies 6 are fixed to the prism 7, and thus the projection unit 2 is manufactured.

According to the present embodiment described above, the following advantages are obtained.

FIGS. 7 through 10 are diagrams for explaining the advantages in the present embodiment. Specifically, FIGS. 7 through 10 respectively show the states of rotating the support body 6, which is supported in the positional relationship of the members 3 through 5 to the prism 7 shown in FIG. 5, 5° around the respective axes passing through respective positions SP, SP1 through SP3 in parallel to the X axis.

Figure 8:
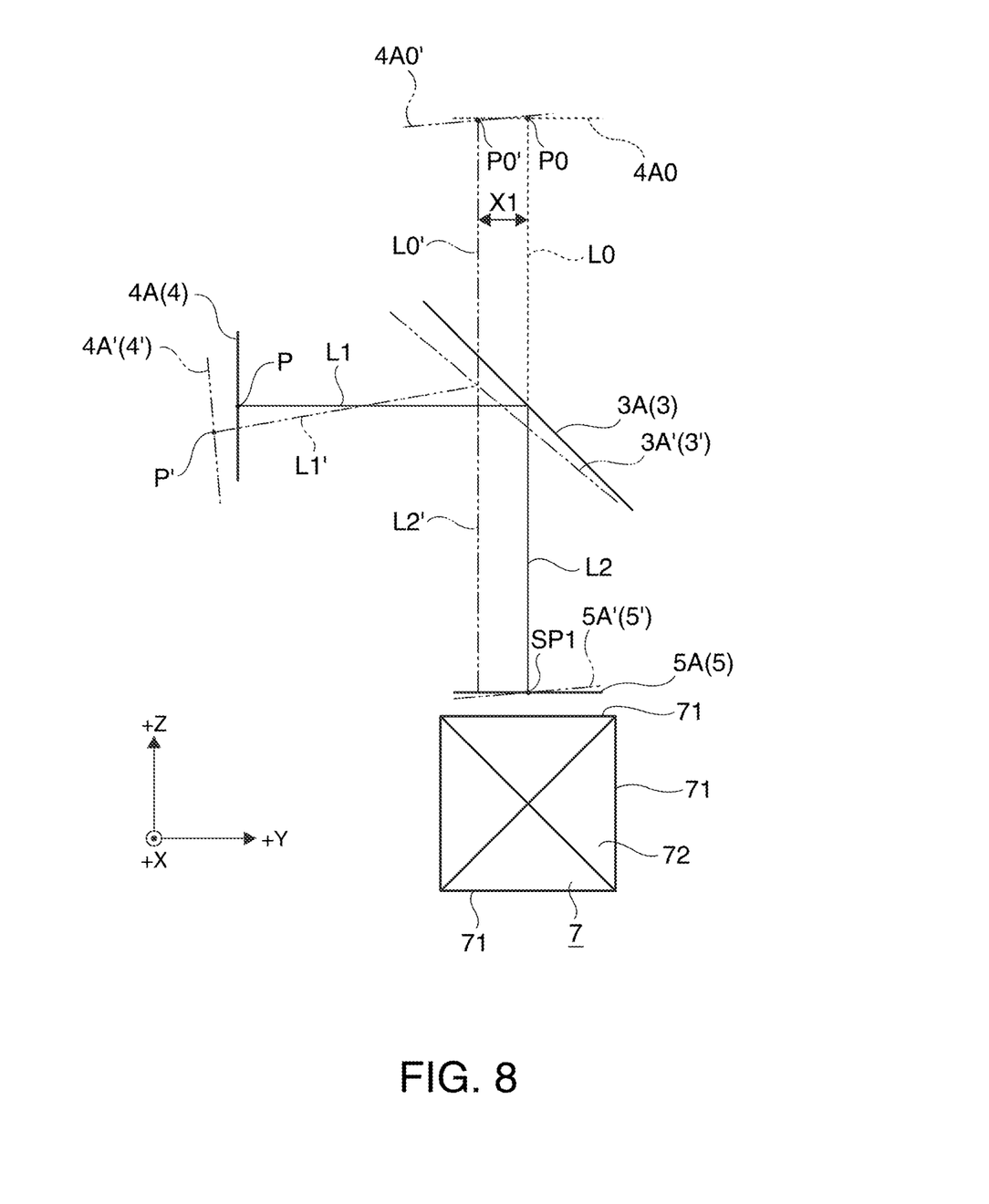
FIG. 8 is a diagram for explaining the advantage of the present embodiment.

It should be noted that as shown in FIG. 8 the position SP1 is a position coincident with the center position of the light entrance surface 5A in the polarization plate 5 when viewed from the direction along the X axis. Further, as shown in FIG.

Figure 9:
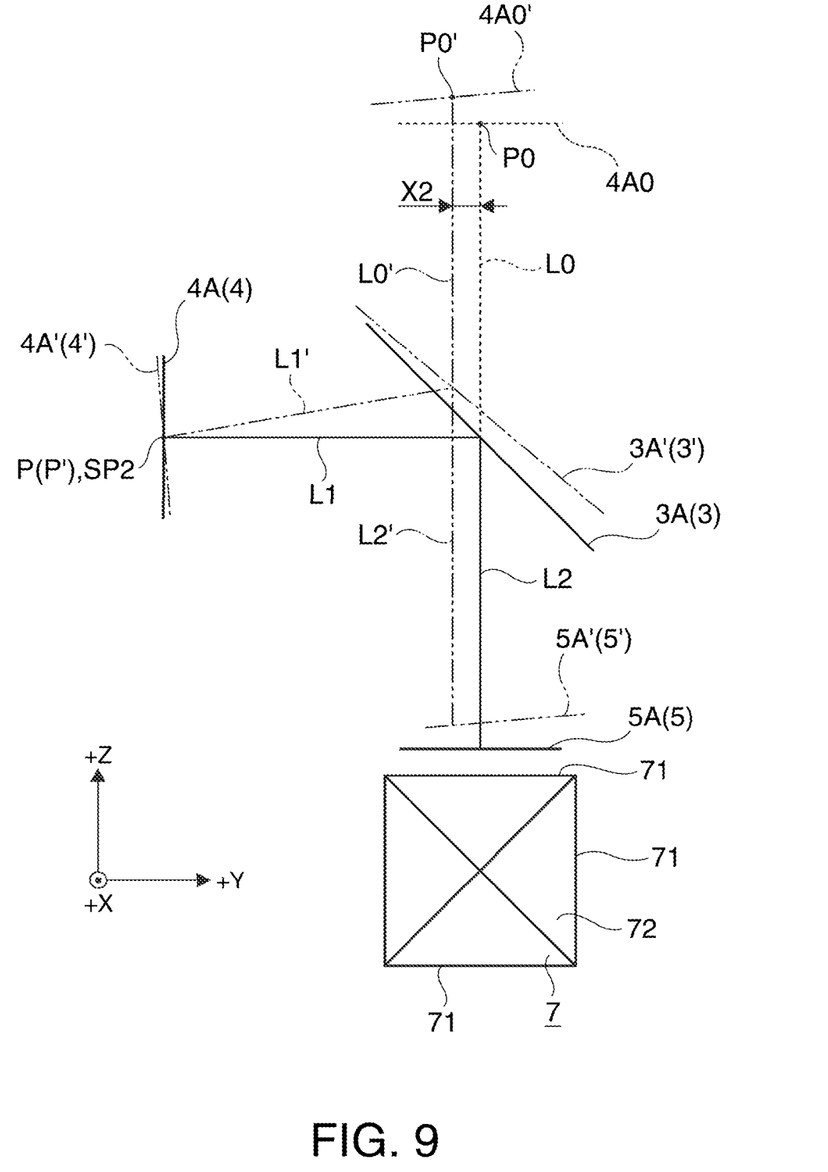
FIG. 9 is a diagram for explaining the advantage of the present embodiment.
Figure 10:
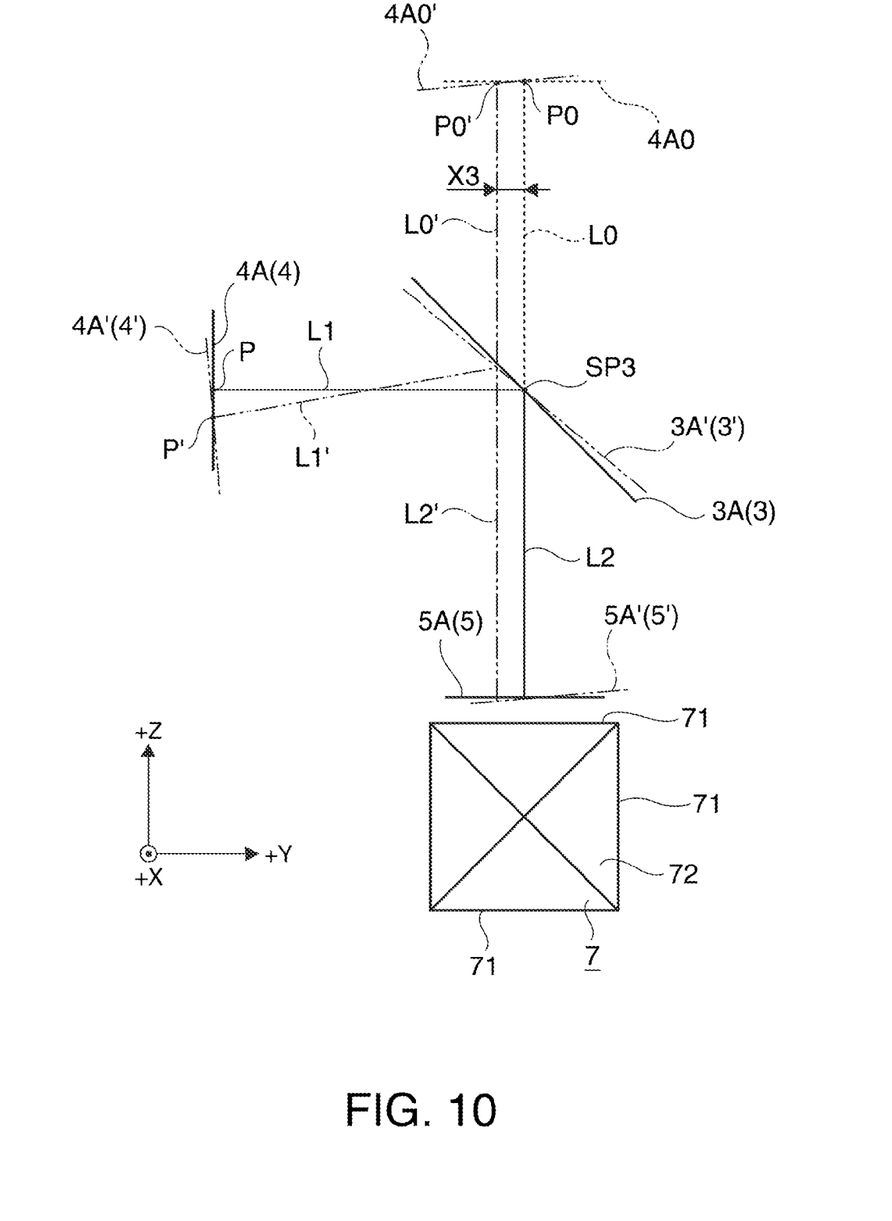
FIG. 10 is a diagram for explaining the advantage of the present embodiment.

9, the position SP2 is a position coincident with the center position P of the light modulation surface 4A when viewed from the direction along the X axis. Further, as shown in FIG. 10, the position SP3 is a position coincident with the center position of the polarization split surface 3A when viewed from the direction along the X axis.

Further, in FIGS. 7 through 10, the polarization split surface 3A (the wire grid 3) after the rotation is indicated by a dashed-two dotted line, and attached with the reference symbol of 3' (3A') added with "'" for the sake of convenience of explanation. The same applies to the light modulation surface 4A (the reflective light modulation device 4), the light entrance surface 5A (the polarization plate 5), the principal rays L1, L2, the pseudo light modulation surface 4A0, the virtual image center P0, and the pseudo principal ray L0.

Since the support positions SP and the support structures 10 respectively located in the direction along the X axis are set as described above in the present embodiment, if the support body 6 is displaced from the desired position (the position of the support body 6 after the position adjustment), it results that the rotation centered on the virtual image center P0 occurs.

Figure 7:
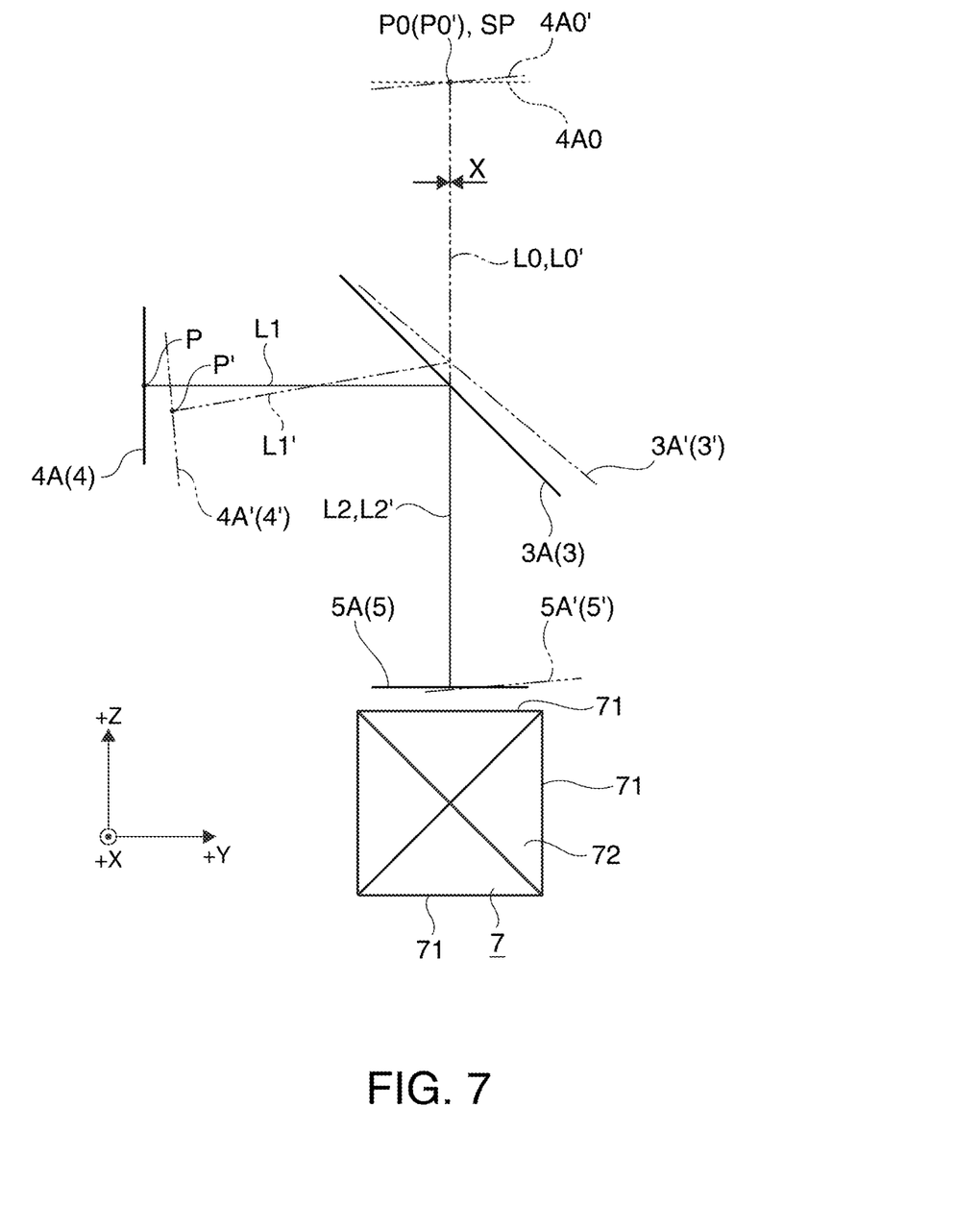
FIG. 7 is a diagram for explaining an advantage of the present embodiment.

For example, as shown in FIG. 7, even in the case in which the support body 6 is rotated 5° around the axis, which passes through the support position SP, and is parallel to the X axis, it results that the rotation around the virtual image center occurs, and therefore, the position of the pseudo principal ray L0' after the rotation becomes coincident with the position of the pseudo principal ray L0. It should be noted that since the rotation around the virtual image center P0 occurs, the same applies to the case in which the support body 6 is rotated around another axis (e.g., an axis along the Y axis or the Z axis).

Therefore, even in the case in which the support body 6 is displaced from the desired position when curing the ultraviolet cure adhesive executed after the position adjustment of the reflective light modulation device 4 or when an external force is applied to the projector 1 while using the projector 1, it is possible to zero the displacement amount X (FIG. 7) of the pseudo principal rays L0, L0' due to the displacement of the support body 6, and as a result, it is possible to zero the amount of the pixel shift. Therefore, the preferable projection image can be formed.

In contrast thereto, if, for example, the support position SP is set to the support positions SP1 through SP3 shown in FIGS. 8 through 10 differently from the present embodiment, it results that the rotation around a position separate from the virtual image center P0 occurs when the support body 6 is displaced from the desired position. Therefore, the displacement amounts X1 through X3 of the pseudo principal rays L0, L0' due to the displacement of the support body 6 becomes large, and as a result, the amount of pixel shift becomes large.

It should be noted that since the distances from the virtual image center P0 to the respective support positions SP1 through SP3 descend in this order, the displacement amounts X1 through X3 also descend in this order as shown in FIGS. 8 through 10.

Further, since the support body 6 is supported via the fixation member 9 at the respective support positions SP respectively located at the positions described above, it is possible to rotate the support body 6 around the virtual image center P0 when the support body 6 is displaced from the desired position while keeping the support state of the support body 6 by the connection members 8A, 8B via the fixation members 9 stable.

Further, the support structures 10 respectively located in the direction along the X axis are disposed so as to be 180° rotationally symmetric about the normal line N passing through the virtual image center P0.

Thus, it is possible to make the support structures 10 substantially the same as each other, and thus, the support structures 10 can be manufactured easily.

Further, the connection members 8A, 8B are respectively fixed to the pair of intersection end surfaces 72, and are disposed so as to sandwich the support body 6 therebetween.

Thus, since the connection members 8A, 8B do not intervene between the prism 7 and the support body 6, the connection members 8A, 8B can easily be attached, and the projection unit 2 can be manufactured easily.

It should be noted that the invention is not limited to the embodiment described above, but includes modifications and improvements within a range where the advantages of the invention can be achieved.

Although the structure of supporting the support body 6 via the fixation members 9 is adopted as the support structure of the support body 6 using the connection members 8A, 8B in the embodiment described above, the structure is not limited thereto, but the structure of directly supporting the support body 6 with the connection members without intervening other members such as the fixation members 9 can also be adopted.

Although the support positions SP are set so as to be coincident with the virtual image center P0 when viewed from the direction along the X axis, this is not a limitation, but it is also possible to set the support positions to any positions providing the support positions are disposed on the opposite side to the disposition position of the reflective light modulation device 4 with respect to the plane S.

Although the support positions SP and the support structures 10 are respectively located along the X axis, and are respectively disposed at positions 180° rotationally symmetric about the normal line N passing through the virtual image center P0 in the embodiment described above, this is not a limitation. It is also possible to adopt the configuration in which the support positions SP and the support structures 10 are respectively located, for example, along the Y axis, providing the positions are 180° rotationally symmetric about the normal line N passing through the virtual image center P0.

Although the connection members 8A, 8B are respectively fixed to the pair of intersection end surfaces 72, and are disposed so as to sandwich the support body 6 therebetween in the embodiment described above, this is not a limitation.

It is also possible to adopt the connection members having the configuration of, for example, having the main body attached to the light entrance surface 71 of the prism 7, and a pair of arm sections projecting from the positions opposed to each other toward the light emission side in the outer periphery of the main body, and supporting the support body with the pair of arm sections similarly to the related art (similarly to the adjustment member described in Document 1).

Further, for example, it is also possible to adopt the configuration of supporting the support body 6 by either one of the connection members 8A, 8B providing the support body 6 can be rotated around the position adjacent to the virtual image center P0 or around the virtual image center P0.

In the embodiment described above, the manufacturing method of the projection unit 2 is not limited to the manufacturing method explained in the embodiment described above.

For example, although the fixation members 9 are attached to the support body 6 and the connection members 8 after the position adjustment of the reflective light modulation device 4, this is not a limitation, but the method described below can also be adopted.

That is, prior to the position adjustment, the fixation members 9 and the support body 6, the connection members 8 are temporarily fixed via the adhesive (in the state in which the first and second bonding surfaces 91, 92 and the support body 6, the connection members 8 adhere to each other due to the surface tension of the adhesive). Then, the fixation members 9 are made to follow the movement of the support body 6 in the position adjustment, and then the adhesive is cured after the position adjustment.

Further, although the position adjustment of the reflective light modulation device 4 is executed while checking the projection image on the screen in the embodiment described above, for example, this is not a limitation, but it is also possible to adopt the method of executing the position adjustment while directly detecting the light beam for position adjustment emitted from the prism 7 using a CCD camera and so on. In other words, it is also possible to adopt the method of integrating the optical device 2A and the projection lens 2B via the base body 2C after manufacturing the optical device 2A.

Although the wire girds 3 are used as the reflective polarization plates in the embodiment described above, any reflective polarization plates having other configurations can also be adopted.

As the reflective polarization plate, it is also possible to adopt, for example, a polarization split element formed of a dielectric multilayer film, a polymeric layered polarization plate obtained by stacking in a layered manner organic materials having refractive index anisotropy (birefringent property) such as a liquid crystal material, an optical element obtained by combining a reflective circularly polarizing plate for separating the unpolarized light into a right-handed circularly polarized light and a left-handed circularly polarized light and a ¼ wave plate, an optical element for performing separation into a reflective polarized light and a transmissive polarized light using the Brewster angle, and a hologram optical element using a hologram.

The invention can be applied to a projector used for presentations and a home theater.

The present application claim priority from Japanese Patent Application No. 2010-266826 filed on Nov. 30, 2010, which is hereby incorporated by reference in its entirety.

What is claimed is:

1. A projector comprising:
   a plurality of reflective light modulation devices which respectively modulates a plurality of colored lights;
   a plurality of reflective polarization plates respectively disposed in a tilted manner with respect to the plurality of reflective light modulation devices, and which respectively performs polarization split on the plurality of incident colored lights;
   a color combining optical device which combines the colored lights, which are respectively modulated by the plurality of reflective light modulation devices, and on which the polarization split is respectively performed by the plurality of reflective polarization plates;
   a plurality of support bodies which respectively supports the reflective light modulation devices and the reflective polarization plates; and
   a connection member which fixes the color combining optical device and supports the support bodies,
   wherein support positions of the support body by the connection member are disposed on an opposite side to a disposition position of the reflective light modulation device with respect to a plane including a polarization split surface of the reflective polarization plate.

2. The projector according to claim 1, wherein
the support positions are respectively disposed at positions symmetric about a plane including light axes of an incident light beam and an outgoing light beam of the reflective polarization plate.

3. The projector according to claim 2, wherein
a center of the support positions is located at a position extending from the virtual image center in a direction perpendicular to a plane including light axes of an incident light beam and an outgoing light beam of the reflective polarization plate assuming that a light modulation surface obtained by virtually displacing symmetrically a light modulation surface of the reflective light modulation device about the plane is a pseudo light modulation surface, and a center position of the pseudo light modulation surface is a virtual image center if the light modulation surface of the reflective light modulation device is located at a back focus position of a projection lens, and is disposed at a position with no pixel shift between the reflective light modulation devices.

4. The projector according to claim 1, wherein
the support positions are respectively disposed at positions 180° rotationally symmetric about a normal line of the pseudo light modulation surface passing through the virtual image center assuming that a light modulation surface obtained by virtually displacing symmetrically a light modulation surface of the reflective light modulation device about the plane is a pseudo light modulation surface, and a center position of the pseudo light modulation surface is a virtual image center if the light modulation surface of the reflective light modulation device is located at a back focus position of a projection lens, and is disposed at a position with no pixel shift between the reflective light modulation devices.

5. The projector according to claim 4, wherein
a support structures of the support body by the connection member are disposed so as to be 180° rotationally symmetric about a normal line of the pseudo light modulation surface passing through the virtual image center.

6. The projector according to claim 1, wherein
the connection members are provided as a pair, respectively fixed to both of a pair of intersection end surfaces intersecting with a plurality of light entrance surfaces to which the plurality of colored lights are respectively incident in the color combining optical device, and are disposed so as to sandwich the support body.

* * * * *